United States Patent [19]
Landherr

[11] 3,739,808
[45] June 19, 1973

[54] HYDRAULIC SHOCK DAMPING DEVICE

[75] Inventor: Lawrence R. Landherr, Racine, Wis.

[73] Assignee: Milwaukee Cylinder Corporation, Cudahy, Wis.

[22] Filed: Jan. 13, 1972

[21] Appl. No.: 217,477

[52] U.S. Cl................... 137/493, 188/280, 137/498
[51] Int. Cl............................................. F16k 17/26
[58] Field of Search .................... 137/112, 87, 113, 137/493, 516.25, 517, 106, 498, 493.7, 493.8; 188/280, 313, 314; 91/420

[56] References Cited
UNITED STATES PATENTS

| | | | |
|---|---|---|---|
| 2,483,312 | 9/1949 | Clay................................... | 137/106 |
| 2,590,454 | 3/1952 | Pilch................................... | 91/420 |
| 2,623,725 | 12/1952 | Sands............................ | 137/516.25 |
| 2,890,683 | 6/1959 | Pilch................................... | 91/420 |
| 3,085,589 | 4/1963 | Sands..................... | 137/516.25 X |
| 3,411,521 | 11/1968 | Johnson............................. | 137/106 |
| 3,561,471 | 2/1971 | Sands................................. | 137/498 |
| 3,675,487 | 7/1972 | Meuller.......................... | 137/517 X |
| 3,683,957 | 8/1972 | Sands................................. | 137/498 |

Primary Examiner—Henry T. Klinksiek
Attorney—James E. Nilles

[57] ABSTRACT

A hydraulic shock damping device for a double-acting hydraulic snubbing piston-cylinder assembly, the device including a pressure responsive fluid bypass shut-off valve connected to both ends of the cylinder, an accumulator connected to maintain fluid pressure in the cylinder, an accumulator control valve responsive to a predetermined pressure to close the high pressure connection between the accumulator and high pressure side of the cylinder and pressure responsive relief valves connected to each side of the device and to the accumulator to relieve the pressure in the device when it exceeds a predetermined maximum.

18 Claims, 7 Drawing Figures

Patented June 19, 1973 3,739,808

HYDRAULIC SHOCK DAMPING DEVICE

BACKGROUND OF THE INVENTION

In industrial applications such as nuclear reactor power stations or the like hydraulic snubber assemblies are used to damp vibrations in the support structure. In such applications there is considerable variance in temperatures in the piping system which produces thermal expansion of various parts of the support structure and the piping system. Stress conditions therefore occur in the super-structure and piping system which are minimized by applying external damping forces at the critical points. However, under shock loads, which produce high frequency vibrations in the superstructure and piping system, severe damage can occur if those vibrations are not suppressed.

Hydraulic snubbing piston and cylinder assemblies are presently used to prevent such damage by damping the vibration. However, under shock conditions the frequency of vibration is often so great that merely damping the vibration is not sufficient to prevent structural damage to both the piping system and the superstructure.

SUMMARY OF THE INVENTION

The hydraulic shock damping device of the present invention allows for normal vibration of a snubbing piston and cylinder assembly up to a predetermined frequency of vibration. When the frequency of vibration exceeds the predetermined frequency the snubber piston and cylinder assembly is instantaneously decelerated or stopped. This is accomplished by connecting a pressure responsive bypass valve across the cylinder to prevent fluid transfer whenever the predetermined vibration is surpassed. Because of the high pressures which occur at shut off, relief valves are provided to protect the cylinder and shut-off valve from damage due to excessive pressures occurring in the device.

In the static mode and the free flow mode, an accumulator is used to maintain fluid pressure on both sides of the cylinder. The accumulator will compensate for any leakage in the system and allow for breathing due to thermal expansion and contraction of the fluid in the system. The inclusion of the accumulator makes the present invention a self-contained unit which can be assembled and remain installed for long periods of use without any maintenance. In order to prevent high pressure fluid from damaging the accumulator, an accumulator control valve assembly is provided in the device to automatically close off the accumulator from the high pressure side of the cylinder.

DRAWINGS

DESCRIPTION OF THE INVENTION

Figure 1:
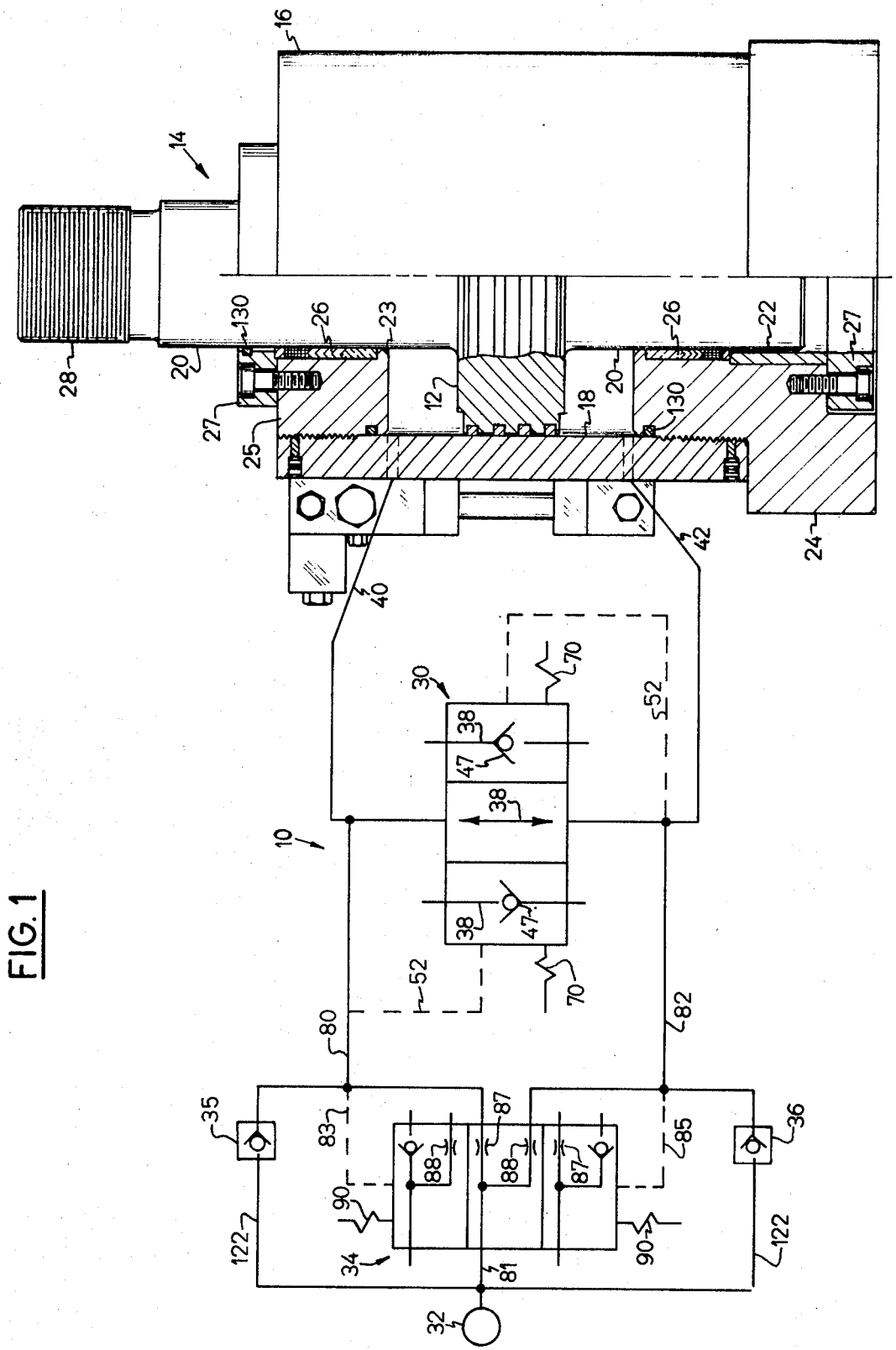
FIG. 1 is a view of a double rod snubbing piston and cylinder assembly partly broken away and shown connected to a schematic representation of the hydraulic shock damping apparatus of the present invention.

The hydraulic shock damping device 10 of this invention is used to control the free flow of fluid across the piston 12 in a double rod snubbing piston-cylinder assembly 14. In this regard, the snubbing assembly 14 includes a housing 16 having a cylinder 18 in which a piston 12 is mounted for reciprocal movement. The piston 12 is a double rod type piston having rods 20 of equal diameter on each end mounted for reciprocal movement in passages 22 and 23 in end caps 24 and 25, respectively. Since the rods are of equal diameter, equal amounts of fluid will be displaced from the cylinder on movement of the piston 12. The rods are sealed within the passage 22 by means of VITON CHEVRON packing type seals 26 held therein by plates 27. One of the rods 20 is provided with a threaded section 28 which is used to connect the piston 12 to a structural support element or brace.

The snubbing piston and cylinder assembly 14 is normally used to damp vibrations by restricting the flow of fluid from one side of the cylinder 18 to the other. In structures which are subjected to high frequency vibrations, due to shock conditions, it is desirable to instantaneously decelerate the frequency of vibration of the structure in order to minimize possible structural damage whenever a predetermined or critical frequency is encountered. The shock damping device 10 is positioned in the flow path between the ends of the cylinder 18 to allow for the unrestricted flow of fluid under normal operation and to provide an instantaneous stop in flow with a corresponding deceleration of vibration whenever a predetermined frequency of vibration is imposed on the structure.

The shock damping device 10 includes a pressure responsive bypass valve assembly 30 positioned to respond to the flow of fluid between the ends of the cylinder 18 to prevent flow when a predetermined pressure is reached. An accumulator 32 is connected to both ends of the cylinder 18 to maintain a constant fluid pressure in the system and to compensate for variations in temperature of the fluid in the system. The accumulator 32 is protected from high pressure in the system by means of a control valve assembly 34. High pressure in the cylinder 18 is relieved by means of poppet valves 35 and 36 connected to each end of the cylinder 18 to relieve pressure whenever the fluid pressure in the line exceeds the responding pressure of the bypass valve assembly 30 by a fixed amount.

BYPASS VALVE ASSEMBLY

The bypass valve assembly 30 as seen in FIGS. 2 through 5 is positioned within a passage 38 in the housing 16 and is connected to the cylinder 18 by means of passages 40 and 42. The bypass valve assembly 30 includes valve spool 54 mounted for axial movement within the passage 38, a valve spool bushing 44, a pair of valve spool seat bushings 46 provided on each side of the bushing 44 and a pair of bushing retainers 48 threadedly received in each end of the passage 38. Each of the valve spool seat bushings 46 includes a valve seat 47, a peripheral groove 50 and a number of radially inwardly directed passages 52 which terminate in a central bore 60. The valve seat bushing 46 is aligned with the fluid passages 40 and 42 to provide for fluid communication through the peripheral groove 50 and passages 52 into the bushing 44. The bushing retainers 48 are provided with recesses 45 in their inner ends.

Figure 6:
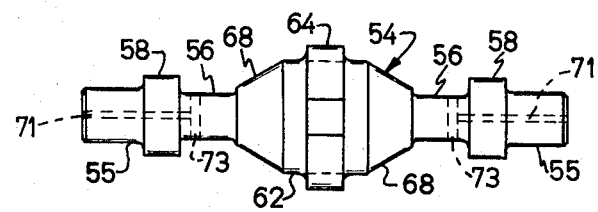
FIG. 6 is a side view of the valve spool for the bypass valve assembly.
Figure 7:
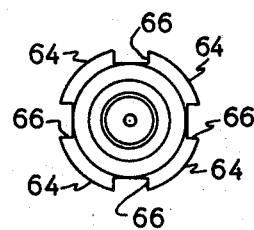
FIG. 7 is an end view of the valve spool shown in FIG. 6.

The flow of fluid through the bushing 44 is controlled by means of the valve spool 54 which is biased by means of springs 70 in recesses 45 to a neutral position within the bushing 44. In this regard, the valve spool 54 as seen in FIG. 6 includes an axial rod 56 having a flange 58 at each end. The flanges 58 are mounted for axial movement within the bore 60 of each of the valve spool seat bushings 46. Rod extensions 55 extend outward from each end of the valve spool 54 into the recesses 45. An enlarged hub 62 is centrally located on the rod 56 and includes a radially outwardly extending flange 64 having a number of grooves 66. The flange 64 is mounted for axial movement within the bushing 44 and the grooves 66 in the flange 64 allow for the free flow of fluid through the flange 64. Tapered valve surfaces 68 are provided on each end of the hub 62 to engage the valve seats 47 provided on each of the valve spool seat bushings 46.

It should be apparent that when the flow of fluid through the grooves 66 in flange 64 exceeds the free flow capability of the grooves, the force of fluid will tend to move the valve spool in the direction of fluid flow. On engagement of one of the valve surfaces 68 with one of the valve seats 47 the passage 38 will be closed and further flow of fluid through the passage 38 will be stopped.

Means are provided to control the movement of the valve spool 54 in the form of valve springs 70 provided in the recesses 45 in each of the bushing retainers 48. In this regard, the springs 70 are positioned in recesses 45 and bear against spring retainers 74 positioned on the extension 55 at each end of the valve spool 54. The spring retainers 74 are seated against the valve spool seat bushings 46 and have an inner diameter smaller than the outer diameter of the flange 58 on the valve spool 54. Movement of the valve spool 54 will compress one or the other of the springs 70. The spring rate of the springs 70 is normally equal to provide equal response to fluid pressure in passage 38, however it is within the contemplation of this invention to use springs of different spring rate where different responses are required.

Means are provided for balancing the fluid pressure across the flanges 58 at each end of the valve spool 54. Such means is in the form of an axial duct 71 and a transverse duct 73 provided at each end of the valve spool 54. The transverse ducts 73 are connected to the axial ducts 71 to provide for fluid communication between the passage 38 and the recess 45.

ACCUMULATOR AND CONTROL VALVE

Figure 2:
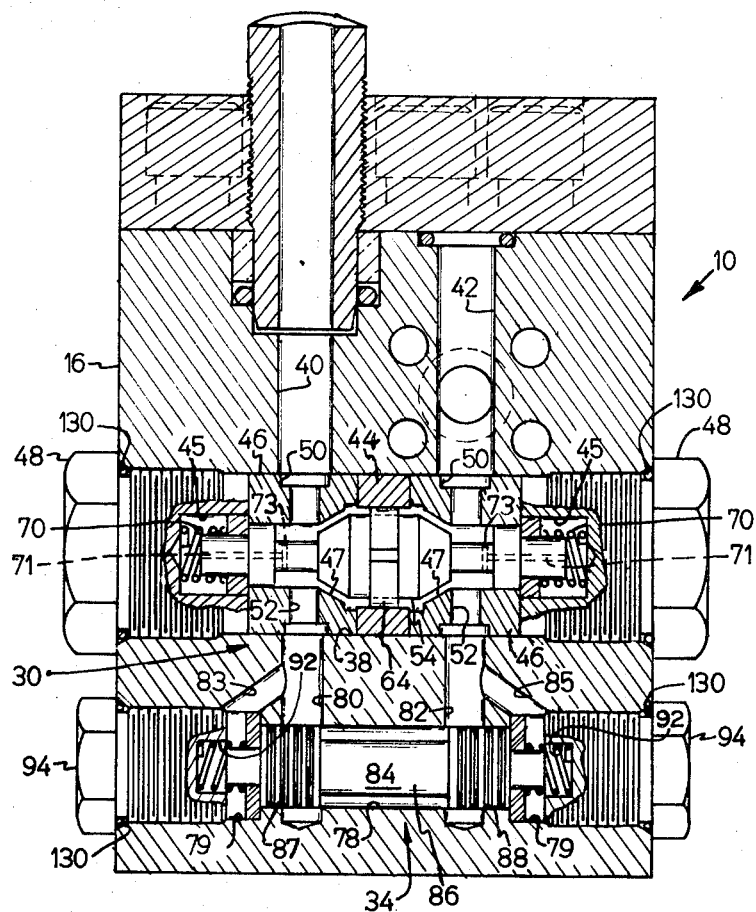
FIG. 2 is a cross sectional view taken on line 2—2 of FIG. 4 showing the bypass valve assembly and the accumulator control valve assembly.
Figure 3:
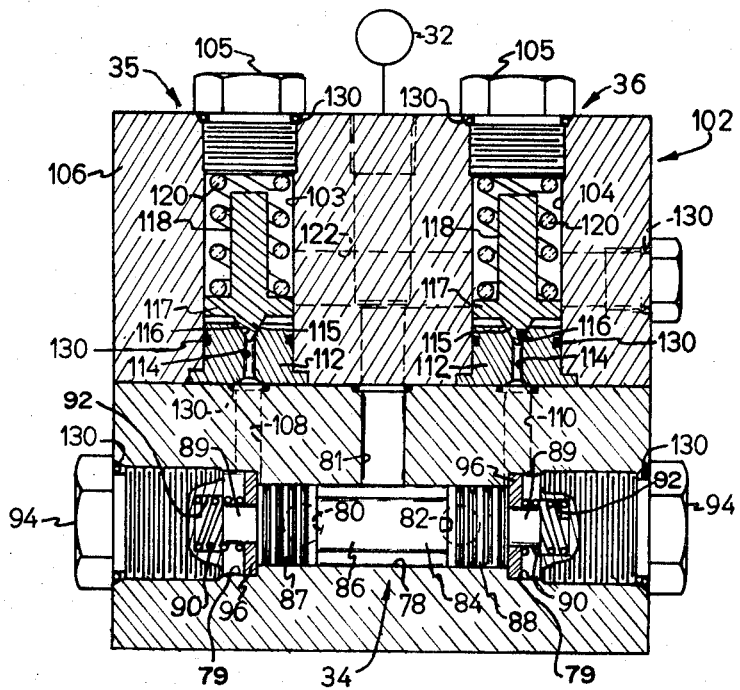
FIG. 3 is a cross sectional view taken on line 3—3 of FIG. 4 showing the relief valve assembly connected to the accumulator control valve assembly.
Figure 4:
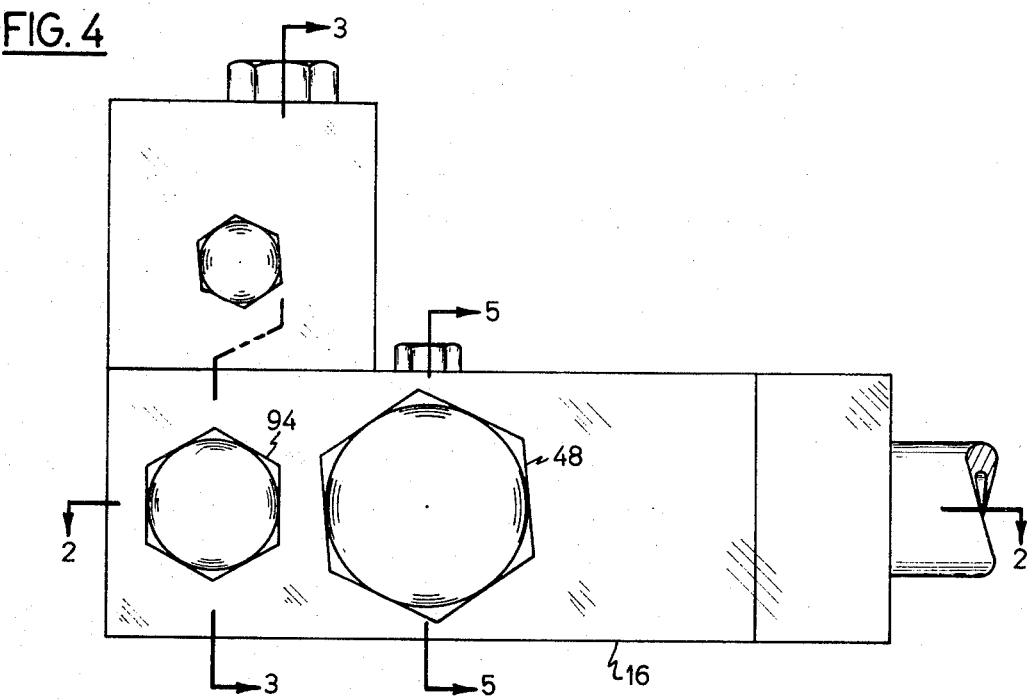
FIG. 4 is an end view of the hydraulic damping device of this invention.
Figure 5:
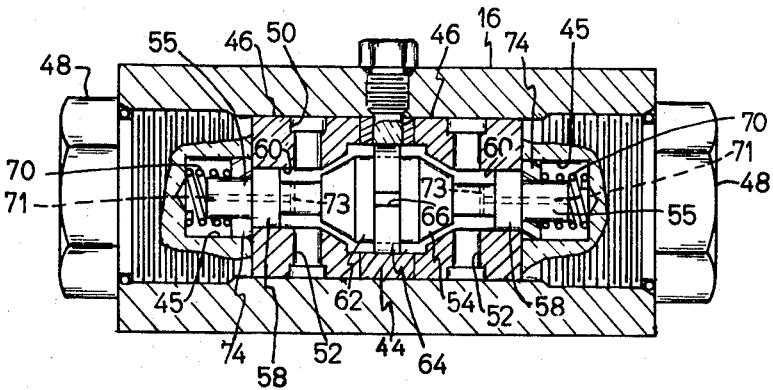
FIG. 5 is a cross sectional view taken on line 5—5 of FIG. 4 showing the bypass valve assembly.

Means are provided for maintaining a constant fluid pressure in the cylinder 18 in the form of the accumulator 32. The accumulator 32 is connected to the passages 40 and 42 by means of an accumulator control valve assembly 34 provided in the housing 16. Referring to FIGS. 2 and 3 the accumulator control valve assembly 34 is shown positioned within a passage 78 in the housing 16 which is connected to the peripheral grooves 50 of the valve spool seat bushings 48 by means of passages 80 and 82. The passage 78 has a counterbore 79 at each end and is closed by means of end caps 94 having recesses 92. Referring to FIG. 2, it will be noted that fluid in passage 40 is free to flow through the peripheral groove 50 into the passage 80 and fluid in the passage 42 is free to flow through the peripheral groove 50 into the passage 82.

The flow of fluid across the passages 80 and 82 is controlled by an accumulator valve spool 84 positioned in the passage 78. The valve spool 84 includes a central rod 86 having grooved lands 87 and 88 at each end and a spring rod 89 extending axially outwardly from each end. Each of the lands 87 and 88 is positioned to control the flow of fluid through one of the passages 80 and 82. The lands 87 and 88 are spaced a distance apart sufficient to allow for the restricted flow of fluid from the passage 78 into the passages 80 and 82 when the spool is in the neutral position.

The accumulator spool 84 is biased to a neutral position by means of springs 90 mounted on rods 89 and positioned in recesses 92 in end caps 94. The springs 90 bear against spring retainers 96 having inner diameters smaller than the outer diameters of the lands 87 and 88. The spring rates of springs 90 are set lower than the spring rates of springs 70 so that the accumulator valve spool 84 will close before the bypass valve spool 54.

The accumulator spool 84 responds to pressure in the passages 80 and 82 through bypass passages 83 and 85 connected to the enlarged counterbores 79 provided at the ends of the passage 78. When the pressure in passage 80 increases, fluid bypassed through passage 83 to the counterbore 79 will act against the end of the rod and the land 87 causing the accumulator spool to move to the right. Land 87 will close passage 80 and the land 88 will open the passage 82. The accumulator 32 will then be protected from the high pressure fluid in passage 80 and can supply fluid to the low pressure passage 82 if needed.

PRESSURE RELIEF VALVES

Means are provided to relieve the excessive pressure in the cylinder 18 when the bypass valve assembly 30 is closed. Such means is in the form of a poppet or relief valve assembly 102 which includes relief valves 35 and 36. Each of the poppet valves 35 and 36 is positioned in a bore or cylinder 103 and 104, respectively, provided in a valve block 106. Each of the passages 103 and 104 is closed at the outer end by a threaded cap 105. The passage 103 is connected to the counterbore 79a by a passage 108 and passage 104 is connected to the counterbore 79b by a passage 110.

Each poppet valve 35 and 36 includes a valve seat member 112 having a restricted orifice 114 and a valve seat 116. Flow through the orifice 114 is controlled by means of a valve member 118 biased by a spring 120 into engagement with the valve seat 116. It should be noted that the valve member has a small tapered valve extension 115 which closes the orifice 114 and a large flange 117 in passage 103 and 104. Whenever the pressure in one of the counterbores 79a or 79b exceeds a predetermined maximum, the force of the fluid acting on member 115 will force the valve member 118 upward. The full force of the fluid will then act on flange 117 to open the valve fully. The fluid discharged from the relief valve will flow back to the accumulator 32 through a discharge passage 122 provided in block 106.

Although no reference has been made to seals throughout this description, O-ring seals 130 or other appropriate means can be provided to seal any of the passages as indicated in the drawing.

OPERATION

In operation the double rod snubbing piston-cylinder assembly 14 is connected to respond and to damp normal vibrations in the supporting element or braces of a supporting structure. The vibratory motions of the piston 12 produce variations in pressure between the ends of the cylinder 18. This will cause the fluid in the cylinder 18 to flow through the passages 40 and 42 and the bypass valve assembly 30. When the pressure of the fluid passing through the bypass assembly 30 reaches the predetermined response pressure of the valve spool 54, the valve spool 54 will move in the direction of fluid flow toward one end of the passage 38 closing the passage through one of the valve seats 47 to prevent further flow through the passage 38. An instantaneous deceleration in vibration will occur due to the immediate build-up of hydraulic pressure in one end of the cylinder 18. The increase in pressure in the closed passage 40 or 42 will immediately close the accumulator control valve assembly 34. It should be noted that the accumulator 32 will still be connected to the low pressure side of the cylinder 18 but will be protected from high pressure fluid. If the pressure in the closed passage continues to rise, one of the poppet valves 35 or 36 will open, relieving the pressure in the high pressure end of the cylinder so that no structural damage will occur to the shock damping device. The fluid relieved through the poppet valve will be returned to the accumulator 32 for redelivery to the system.

When the motion of the piston 12 reverses, there will be an immediate reversal of fluid movement through the passage 38. The valve spool 54, if the fluid force is great enough, will move toward the other end of the passage until the valve surface 68 engages the valve seat 47 to close the passage 38. An instantaneous build up of pressure will occur in the other end of the cylinder producing an immediate stop in motion of the pistons 12 in the cylinder 18. This sudden stop or deceleration of vibration of the piston 12 in either direction will prevent or interrupt the frequency of vibration of the supported structure.

RESUME

The hydraulic shock damping device of this invention provides an attachment which can be used in combination with a snubbing piston-cylinder assembly to prevent high frequency vibration from occurring in the piston and cylinder assembly. The bypass valve assembly is self-cleaning and requires little if any maintenance. The inclusion of the accumulator and control valve makes the device self-contained and once installed will provide many years of service.

I claim:

1. A shock damping device for controlling the vibratory motion of a snubbing piston and cylinder assembly, said device comprising
   a housing having
   a first passage adapted to be connected to both ends of the cylinder assembly,
   valve seats within said first passage,
   a fluid bypass valve spool mounted in said first passage for movement between said valve seats, said spool including a central hub having tapered surfaces positioned to engage said valve seats and a radially extending flange around the periphery of said hub to guide the valve spool in the first passage, said flange including a number of openings for allowing fluid to flow through said first passage,
   means at each end of said first passage for biasing said valve spool to a neutral position in said first possage, said spool moving into engagement with one of said valve seats in response to a predetermined amount of fluid flow through said passage to close said passage,
   and means connected to each end of said first passage for relieving pressure in said first passage when the pressure exceeds a predetermined pressure.

2. The damping device according to claim 1 including an accumulator connected to each end of said first passage for supplying fluid to said first passage.

3. The damping device according to claim 2 including a pressure responsive control valve assembly connecting said accumulator to said first passage for preventing high pressure fluid in said first passage from flowing into said accumulator.

4. The damping device according to Claim 2 wherein said biasing means comprises a spring at each end of said valve spool.

5. The damping device according to claim 4 wherein said springs have different spring rates.

6. The damping device according to claim 3 wherein said preventing means includes a second passage in said housing in fluid communication with each end of said first passage and a control valve spool mounted in said second passage, said control valve spool having a land at each end, said lands being spaced apart a distance sufficient to allow for restricted flow of fluid from said second passage to said first passage.

7. The damping device according to claim 6 wherein said control valve spool is responsive to pressure at each end of said first passage.

8. The damping device according to claim 2 wherein said pressure relieving means is connected to discharge into said accumulator.

9. A shock damping device for controlling the flow of hydraulic fluid across a double rod snubbing piston and cylinder assembly, said device comprising:
   a housing having a first passage connected to both ends of the snubbing piston and cylinder assembly,
   a pair of valve seats disposed in a spaced relation within said first passage,
   a pressure responsive bypass valve spool mounted in said passage for movement between said valve seats,
   means at each end of said first passage for biasing said spool to a neutral position in said passage,
   said spool moving in response to a predetermined fluid flow through said first passage into engagement with one of said valve seats to close said passage,
   and a second passage in said housing, a fluid passage connecting each end of said second passage to each end of said first passage, an accumulator connected to said second passage and means in said second passage responsive to a pressure differential in said first passage for closing the fluid passage connection to the second passage on the high pressure side of the first passage.

10. The damping device according to claim 9 including a means for relieving pressure in said first passage.

11. The damping device according to claim 9 including a discharge passage between said pressure relieving means and said accumulator.

12. The damping device according to claim 9 wherein said closing means includes a control valve spool having lands at each end spaced a distance apart greater than the distance between the pressure passages.

13. The damping device according to claim 12 including means fo biasing said control valve spool to a neutral position in said second passage to allow fluid to flow from said accumulator through both of said fluid passages to said first passage.

14. The damping device according to claim 9 wherein said biasing means comprises a spring at each end of said bypass valve spool.

15. The damping device according to claim 14 wherein said springs have different spring rates.

16. A device for controlling the flow of fluid from one side of a snubbing piston and cylinder to the other, said device comprising:
- a housing having a first passage and a second passage and means for connecting the ends of each of said first and second passages to the ends of the cylinder,
- a pair of valve seats positioned in a spaced relation in said first passage,
- a valve spool having a central hub mounted for movement between said valve seats, said hub including a tapered valve surface on each ide to engage said valve seats,
- a radially extending flange on said hub,
- a number of openings in said flange to allow for the flow of fluid through said first passage,
- an accumulator connected to said second passage,
- a pressure responsive control valve spool in said second passage having a land at each end positioned to control the flow of fluid from said accumulator through said second passage to said cylinder, and
- means connected to said second passage for relieving pressure at each end of said cylinder.

17. The device according to claim 16 including means for biasing said valve spool to a neutral position in said first passage, and means for biasing said control valve spool to a neutral position in said second passage.

18. The device according to claim 16 wherein said pressure relieving means comprises a relief valve connected to each end of said second passage and a discharge passage connecting said relief valves to said accumulator.

* * * * *